(12) United States Patent
Myers

(10) Patent No.: US 8,249,563 B1
(45) Date of Patent: Aug. 21, 2012

(54) LOCATION SPECIFIC CONTENT FOR MOBILE COMMUNICATION DEVICES

(75) Inventor: Steven Duane Myers, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 316 days.

(21) Appl. No.: 12/609,307

(22) Filed: Oct. 30, 2009

(51) Int. Cl.
*H04M 3/42* (2006.01)
*H04W 24/00* (2009.01)

(52) U.S. Cl. .................. 455/414.1; 455/456.1

(58) Field of Classification Search ............... 455/414.1, 455/456.1–456.6; 705/14
See application file for complete search history.

(56) References Cited

U.S. PATENT DOCUMENTS

2005/0245271 A1* 11/2005 Vesuna ............... 455/456.1
2009/0197616 A1* 8/2009 Lewis et al. ............... 455/456.1

* cited by examiner

*Primary Examiner* — Michael Faragalla (57) ABSTRACT

Embodiments disclosed herein allow a mobile communication device to incorporate location specific content into media for presentation to a user based on the location of the mobile communication device. In a particular embodiment, a mobile communication device wirelessly receives a plurality of media and stores the plurality of media in the mobile communication device. The mobile communication device also determines its location. The mobile communication device receives a user selection indicating a selection of the plurality of media for presentation. In response to the user selection, the mobile communication device determines location specific content for the selected media based on the location of the mobile communication device. After location specific content has been determined, the mobile communication device incorporates the location specific content into the media selection for presentation to a user.

14 Claims, 10 Drawing Sheets

E-BOOK SELECTION 521

[INSERT CITY] is a great city to live and visit. The [INSERT SPORTS TEAM] are doing very well right now. All the fans in [INSERT CITY] cheer for the [INSERT SPORTS TEAM]. Someone coming to visit the city will know that they are getting close when they are able to see the top of the [INSERT BUILDING]. The [INSERT BUILDING] is the tallest building in town and can be seen from very far away. While they are in town, visitors better be sure to go see the [INSERT LANDMARK]. It's one of the coolest places in [INSERT CITY].

LOCATION SPECIFIC CONTENT 501

LOCATION SPECIFIC CONTENT SET 502
City – New York City
Building – Empire State Building
Landmark – Brooklyn Bridge
Sports Team – Yankees LOCATION SPECIFIC CONTENT SET 503
City – Los Angeles
Building – US Bank Tower
Landmark – Santa Monica Pier
Sports Team – Lakers LOCATION SPECIFIC CONTENT SET 504
City – Chicago
Building – Sears Tower
Landmark – Michigan Avenue Bridge
Sports Team – Cubs

FIGURE 5

E-BOOK SELECTION 721

Los Angeles is a great city to live and visit. The Lakers are doing very well right now. All the fans in Los Angeles cheer for the Lakers.

Someone coming to visit the city will know that they are getting close when they are able to see the top of the US Bank Tower. The US Bank Tower is the tallest building in town and can be seen from very far away. While they are in town, visitors better be sure to go see the Santa Monica Pier. It's one of the coolest places in Los Angeles.

LOCATION SPECIFIC CONTENT FOR MOBILE COMMUNICATION DEVICES

TECHNICAL BACKGROUND

Mobile devices such as laptops, cellular phones, and e-book readers are becoming increasingly popular with users. Mobile devices allow users to communicate and perform other functions from any location. Some mobile devices combine many of these functions into one device while others perform a more limited function set.

Mobile devices may communicate over wireless networks such as a cellular network or a Wi-Fi network, with media service providers to access media that can be received over the wireless network. The media can then be presented on the mobile device. Some typical examples of media are music, video, pictures, and electronic books, as well as many other types of media that can be received and presented on a mobile device.

Many services available using a mobile device can be enhanced based on the location of the device. For example, both emergency service calls and commercial calls may be routed based on location. In another example, location dependent advertisements may be delivered to a user based on location.

OVERVIEW

Embodiments disclosed herein allow a mobile communication device to incorporate location specific content into media for presentation to a user based on the location of the mobile communication device. In a particular embodiment, a mobile communication device wirelessly receives a plurality of media and stores the plurality of media in the mobile communication device. The mobile communication device also determines its location. The mobile communication device receives a user selection indicating a selection of the plurality of media for presentation. In response to the user selection, the mobile communication device determines location specific content for the selected media based on the location of the mobile communication device. After location specific content has been determined, the mobile communication device incorporates the location specific content into the media selection for presentation to a user.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
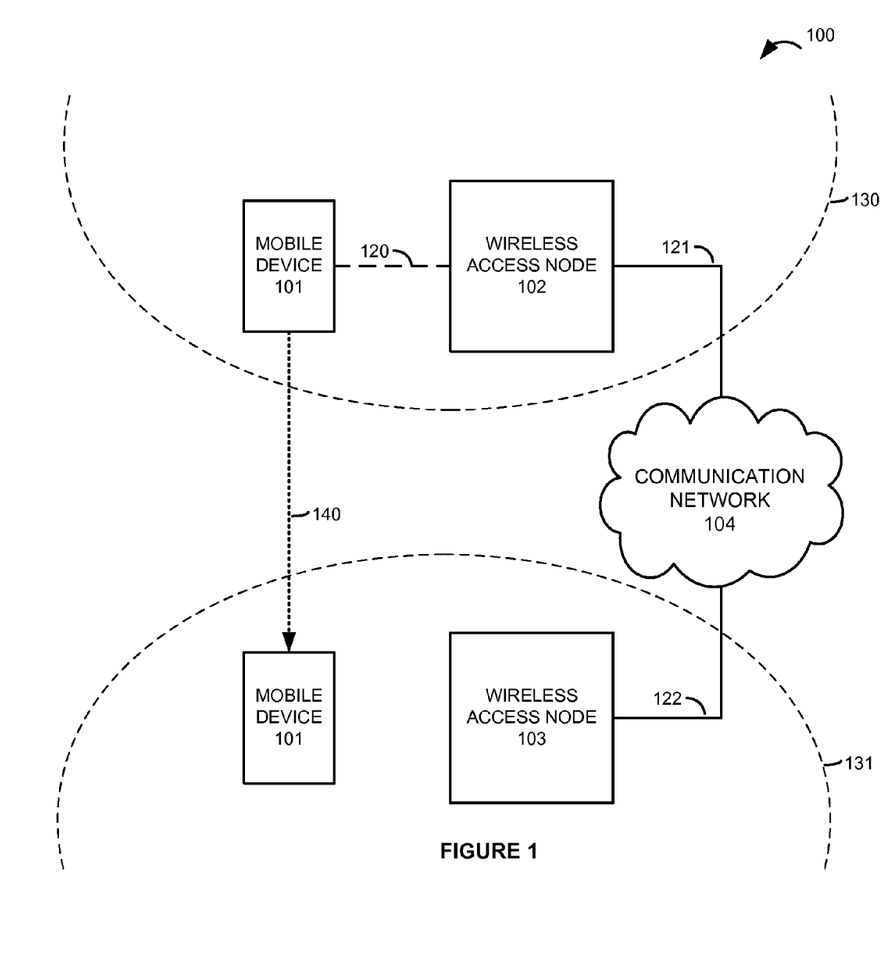
FIG. 1 illustrates a communication system for presenting media with location specific content.

FIG. 1 illustrates communication system 100. Communication system 100 comprises mobile device 101, wireless access node 102, wireless access node 103, and communication network 104.

Mobile device 101 communicates with wireless access node 102 over wireless communication link 120. Wireless access node 102 communicates with communication network 104 over communication link 124. Wireless access node 103 communicates with communication network 104 over communication link 126. Communication links 120-122 could be direct connections or may include various intermediate networks, systems, and devices. Dashed line 130 represents a location where mobile device 101 may be located. Dashed line 131 represents another location where mobile device 101 may be located.

Figure 2:
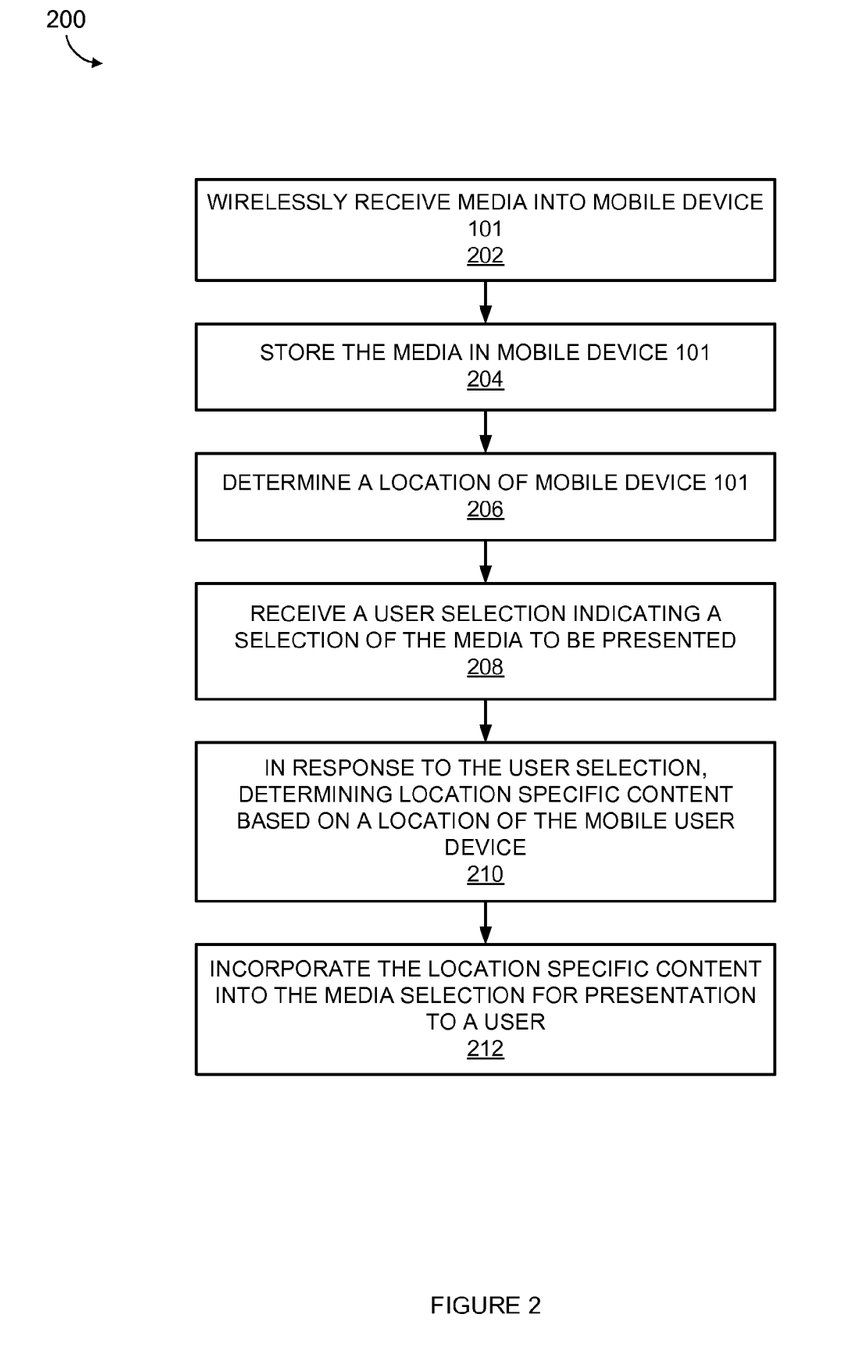
FIG. 2 illustrates the operation of the communication system to present media with location specific content.

FIG. 2 illustrates the operation of communication system 100. In step 202, mobile device 101 wirelessly receives media over wireless link 120. The media is stored in mobile device 101 (step 204). The media may comprise electronic books (e-books), electronic periodicals, audio books, videos, animations or some other audible or visual content.

In step 206, while mobile device is in a location, the location of mobile device 101 is determined. The location of mobile device 101 could vary in specificity. An example of a more specific location is the latitude and longitude coordinates of mobile device 101, while less specific examples include the city, state, or geographic region where mobile device 101 is located.

Mobile device 101 may determine its location in various ways. Mobile device 101 may use the Global Positioning System (GPS) or a positioning determining computer system in communication network 104. Additionally, the location of mobile device 101 may correspond to the location of base station 102 or to the location of the access provider that supplied mobile device 101 with an IP address. Alternatively, a user could input the location of mobile device 101. Mobile device 101 may also use other methods for determining its location.

In step 208, mobile device 101 receives a user selection indicating a selection of the media to be presented. For example, mobile device 301 may include a user interface with the capability of displaying a list or some other representation of all of the media that is stored on mobile device 301. A user can select the media that contains the content that the user wants to view or hear. The selection could be received as a touch of a touch screen, a press of a button, a toggle of a switch, a voice command, or some other way that a user may indicate the media for presentation.

In response to the user selection, mobile device determines location specific content based on the location of mobile device 101. The location specific content is content such as text, illustrations, photographs, audio, video, animations, or other content that corresponds to the selected media and the particular location where mobile device 101 is located. For example, if the media comprises an e-book, then the location specific content may include text of street names, sports teams, landmarks, products, services, or other content that corresponds to the particular location where mobile device 101 is located. The location could be defined as geographic coordinates, a city, a state, a country, or some other geographic area where mobile device 101 may be located.

In step 212, mobile device 101 incorporates the location specific content into the media selection for presentation to a user. When incorporated into the selected media the location specific content is inserted into designated places in the selected media with the appropriate text, illustration, photograph, audio, video, animation, or other content corresponding to the location of mobile device 101.

If mobile device 101 were to move from one location to another, such as is shown by dotted arrow 140, then the location specific content may also change based on new location of mobile device 101. For example, location specific content could be tailored to a specific city. Therefore, mobile device 101 moving from wireless access node 102 located in one city to wireless access node 103 located in another city would change the location specific content that is selected and inserted into the selected media. Likewise, if wireless access node 102 and wireless access node 103 are located in the same city, then moving from wireless access node 102 to wireless access node 103 may not change the location specific content determination. Alternatively, the location specific content incorporated into the selected media may remain constant throughout the presentation of the selected media no matter where mobile device 101 moves in relation to its original determined location. Additionally, if no location specific content can be selected for the location of mobile device 101, then a default content selection may be inserted into the selected media.

Referring back to FIG. 1, mobile device 101 comprises a telephone, transceiver, computer, digital assistant, mobile Internet access device, personal media player, e-book reader, or some other wireless communication apparatus—including combinations thereof. Mobile device 101 comprises an antenna and RF communication circuitry for wireless communication. The RF communication circuitry typically includes an amplifier, filter, RF modulator, and signal processing circuitry. Mobile device 101 also comprises processing circuitry, memory, software, and a user interface.

Wireless link 120 uses air or space as the transport media. Wireless link 120 could use various protocols, such as wireless fidelity, Code Division Multiple Access (CDMA), Global System for Mobile Communication (GSM), Evolution Data Only (EVDO), Worldwide Interoperability for Microwave Access (WIMAX), Long Term Evolution (LTE), Internet, telephony, or some other communication format—including combinations thereof.

Communication links 121-122 uses metal, air, space, optical fiber such as glass or plastic, or some other material as the transport media—including combinations thereof. Communication links 121-122 could use various communication protocols, such as time-division multiplexing (TDM), Internet Protocol (IP), Ethernet, telephony, optical networking, hybrid fiber coax (HFC), communication signaling, wireless protocols, or some other communication format—including combinations thereof. Communication links 121-122 could be a direct link or may include intermediate networks, systems, or devices.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless access node 103 comprises RF communication circuitry and an antenna. The RF communication circuitry typically includes an amplifier, filter, RF modulator, and signal processing circuitry. Wireless access node 103 may also comprise a router, server, memory device, software, processing circuitry, cabling, power supply, network communication interface, structural support, or some other communication apparatus. Wireless access node 103 could be a base station, Internet access node, telephony service node, wireless data access point, or some other wireless communication system—including combinations thereof.

Communication network 104 comprises telephony switches, Internet routers, network gateways, computer systems, communication links, or some other type of communication equipment—including combinations thereof.

Figure 3:
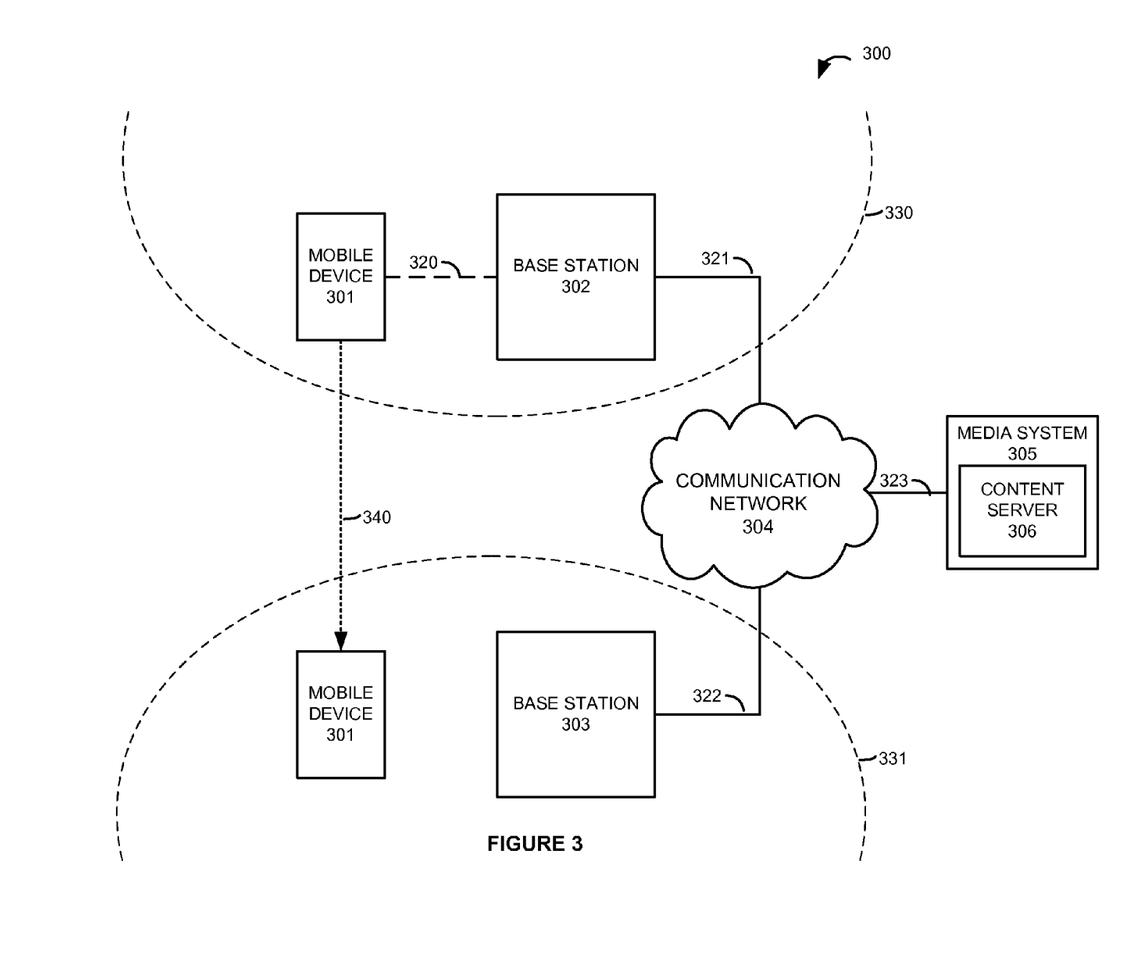
FIG. 3 illustrates a communication system for presenting media with location specific content.

FIG. 3 illustrates communication system 300. Communication system 300 is an example of communication system 100, although communication system 100 may use alternative configurations. Communication system 300 comprises mobile device 301, base station 302, base station 303, communication network 304, and media system 305.

Mobile device 301 communicates with base station 302 over wireless communication link 320. Base station 302 communicates with communication network 304 over communication link 321. Base station 303 communicates with communication network 304 over communication link 322.

Media system 305 comprises a computer system and communication interface. Media system 305 may also include other components such as a router, server, data storage system, and power supply. Media system 305 may reside in a single device or may be distributed across multiple devices. Media system 305 is shown externally to communication network 304, but media system 305 could be integrated within the components of communication network 304. Media system 305 could be a mobile switching center, network gateway system, Internet access node, media server, application server, IMS core, service node, or some other communication system—including combinations thereof. Media system 305 may provide e-books, audio books, or some other audible or visual content that mobile device 301 could receive over communication network 304. Media system 305 may be operated by an online media provider.

Media system 305 includes content server 306. Content server 306 comprises a computer system and other components for providing location specific content. Content server 306 may also be a separate system from media system 305.

Before communication system 300 can perform as described herein, media and location specific content for that media must be created. The media and location specific content may be created using an application programming interface (API). The API provides the content creator with the conventions allowing the creator to author media with the ability to insert location specific content, which is also created using the API. The conventions may allow the content creator to author media in a traditional manner while including the necessary indicators for location specific content. Alternatively, the API may be a set of software instructions that, when executed by computer hardware, provide the content creator with an interface for authoring media and associated location specific content. Likewise, the API may take the form of a programming language with an accompanying compiler.

No matter what form the API takes, the content creator uses the API to indicate where individual items of the location specific content should be placed in the media selection. The API may also allow the creator to define the locations that correspond to each set of location specific content. The API will also allow the creator to update or change the location specific content on the content server.

Figure 4:
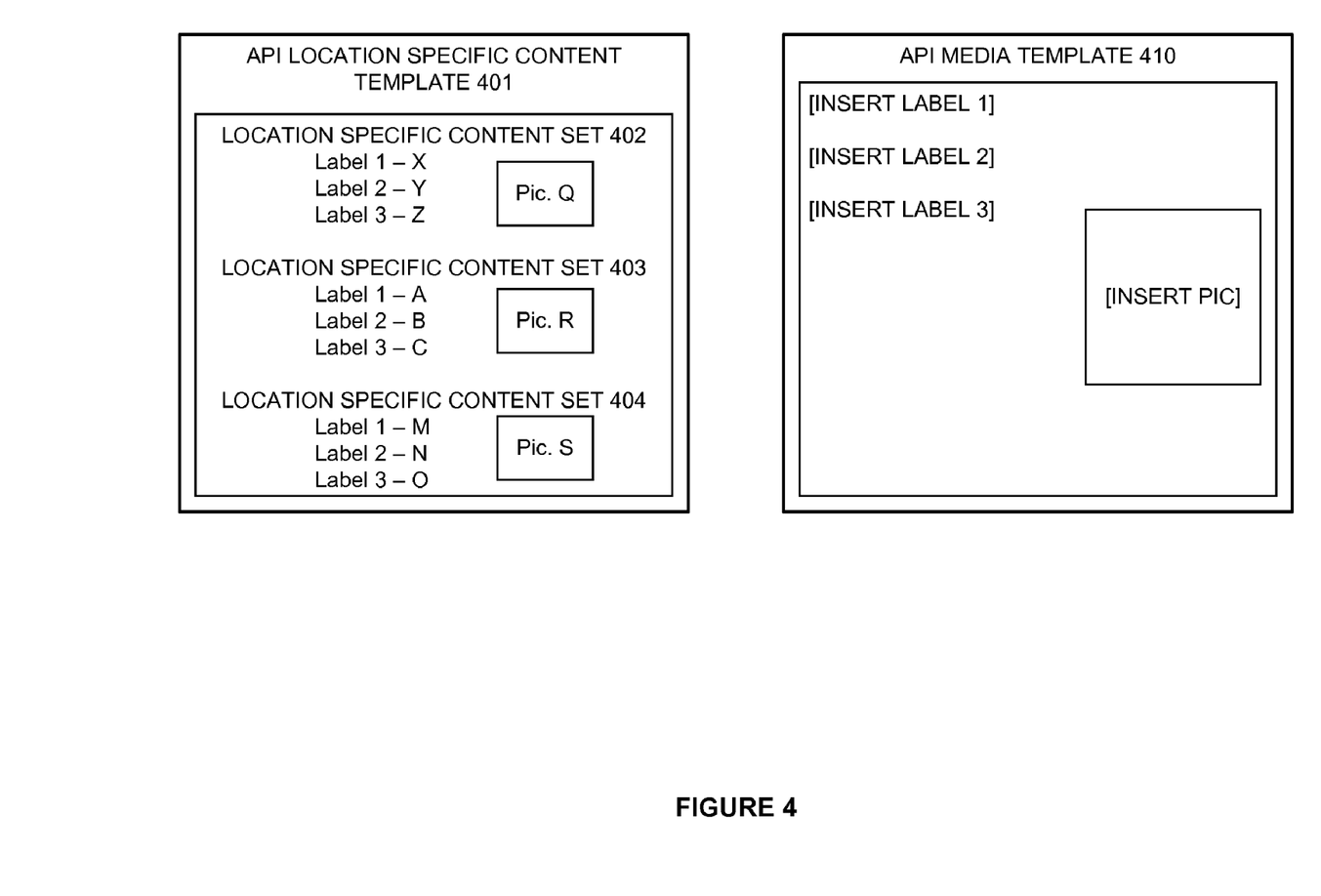
FIG. 4 illustrates example application programming interface templates.

FIG. 4 illustrates templates 401 and 410 that may be provided in accordance with an API to allow a media creator, such as the author of a book, to create media and location specific content. API location specific content template 401 includes location specific content sets 402-404, but may be configured to include others. API media template 410 provides the creator with the appropriate indicators for location specific content insertion. In this generic example, the indicators are labels surrounded by square brackets for demonstrative purposes. However, the indicators and the structure of the API need not contain templates and can be structured in any way so as to obtain the results described herein.

A content creator authors media content into API template 410. The square bracketed indicators will be dispersed throughout the authored content. The creator assigns each location specific content set to a location that may contain a mobile device. The creator also provides location specific items corresponding to the assigned locations. Mobile device 301 presenting the created media will determine which of location specific content sets 402-404 should be placed into the created media. If media device 301, for example, selects location specific content set 404, then the content provided in set 404 will be incorporated into the media created from media template 410. After incorporation, any indicator referring to label 1 is replaced with M, any indicator referring to label 2 is replaced with N, and any indicator referring to label 3 is replaced with O. Additionally, the indicator referring to the insertion of picture is replaced in the created media with Picture S.

Accordingly, the location specific content becomes a part of, and directly relates to, the content of the media and is not merely unrelated location specific information, such as advertisements, presented on the side. The media, therefore, will not be a complete work until after the location specific content is incorporated.

After the media is created, the media is placed in media server 305 for distribution. Likewise, after the location specific content sets are created, they are placed on content server 306 for distribution.

Figure 5:
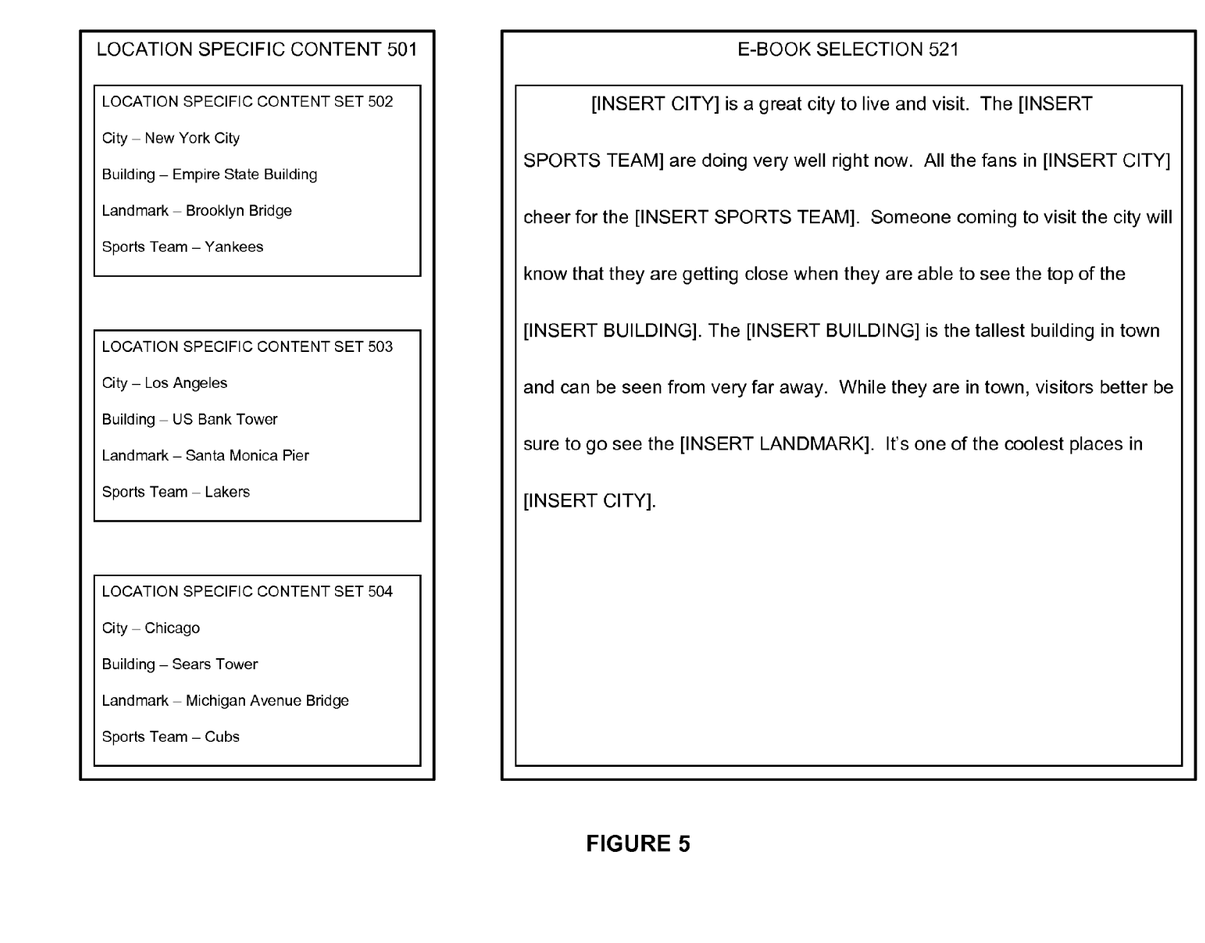
FIG. 5 illustrates location specific content and a media selection.

FIG. 5 illustrates an example of media and location specific content that may be created using the example API from above. FIG. 5 includes location specific content 501 and e-book selection 521. Location specific content 501 comprises location specific content sets 502-504 but may include more location specific content sets that are not pictured. Location specific content 501 is on content server 306 and e-book selection 521 is on media server 305 for distribution to mobile device 301.

Alternatively, e-book selection 521 could also be a visual representation of an audio book. In that case, all the words will be audible and there will be an indicator signifying where the audible location specific content should be inserted into the audible text of the audio book. The indicator could be an inaudible signal that mobile device 301 recognizes, a digital tag or marker, or some other way of identifying an insertion point in the audible text. The resulting media may then be presented to a user through a speaker or other audio device on mobile device 301.

Location specific content set 502 will be incorporated into media selection 521 if mobile device 301 is located in New York City, N.Y. or in a region surrounding New York City. Location specific content set 503 will be incorporated into media selection 521 if mobile device 301 is located in Los Angeles, Calif. or in a region surrounding Los Angeles. Location specific content set 504 will be incorporated into media selection 521 if mobile device 301 is located in Chicago, Ill. or in a region surrounding Chicago. There may also be location specific content for other locations that are not shown in FIG. 5.

Mobile device 301 receives and stores e-book selection 521 from media system 305 via base station 302. Mobile device 301 may receive e-book selection 521 over communication network 304 or may receive the media through an intermediary such as a personal computer. E-book selection 521 may be purchased from an online media provider.

Mobile device 301 determines its location so that it can request location specific content for that location. Mobile device 301 may determine its location in various ways. Mobile device 301 may use GPS or a positioning determining computer system in communication network 304. Additionally, the location of mobile device 301 may correspond to the location of base station 302 or to the location of the access provider that supplied mobile device 301 with an IP address. Alternatively, a user could input the location of mobile device 301. Mobile device 301 may also use other methods for determining its location. For the purposes of this example, mobile device 301 is located in Anaheim, Calif.

Figure 6:
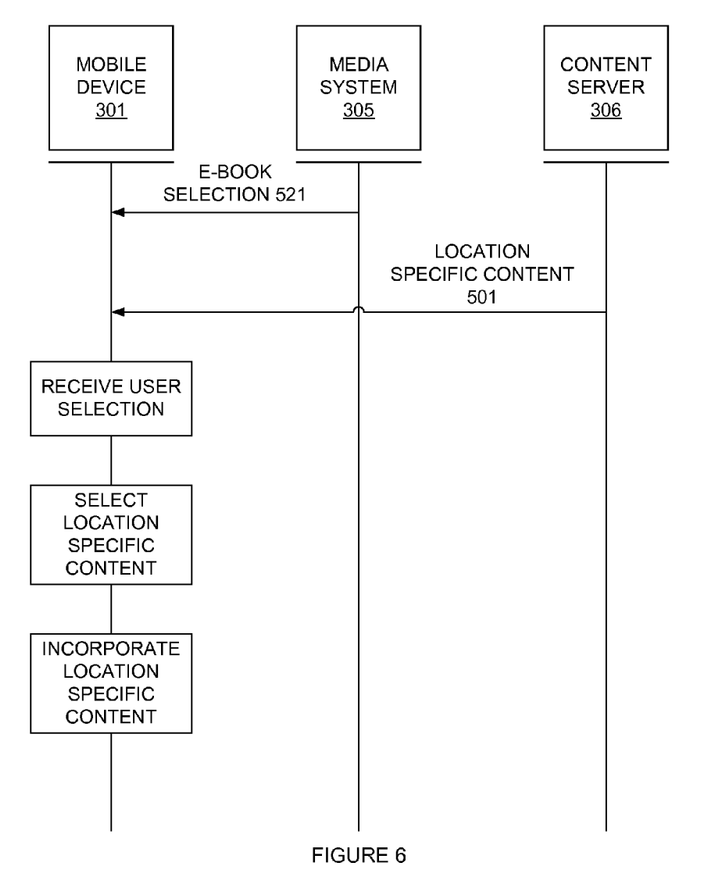
FIG. 6 is a sequence diagram that illustrates determining location specific content.

FIG. 6 is a sequence diagram that illustrates an example of determining location specific content with respect to FIGS. 3, 4, and 5. Mobile device 301 receives both e-book selection 521 from media system 305 and location specific content 501 from content server 306. Mobile device 301 receives a selection from a user indicating that mobile device 301 should display e-book selection 521. In response to the user selection, mobile device selects the location specific content that should be incorporated into e-book selection 521. In this example, since mobile device 301 is located in Anaheim, Calif., which is in a region surrounding Los Angeles, mobile device 301 selects location specific content set 503. Mobile device 301 then incorporates location specific content set 503 into e-book selection 521.

Figure 7:
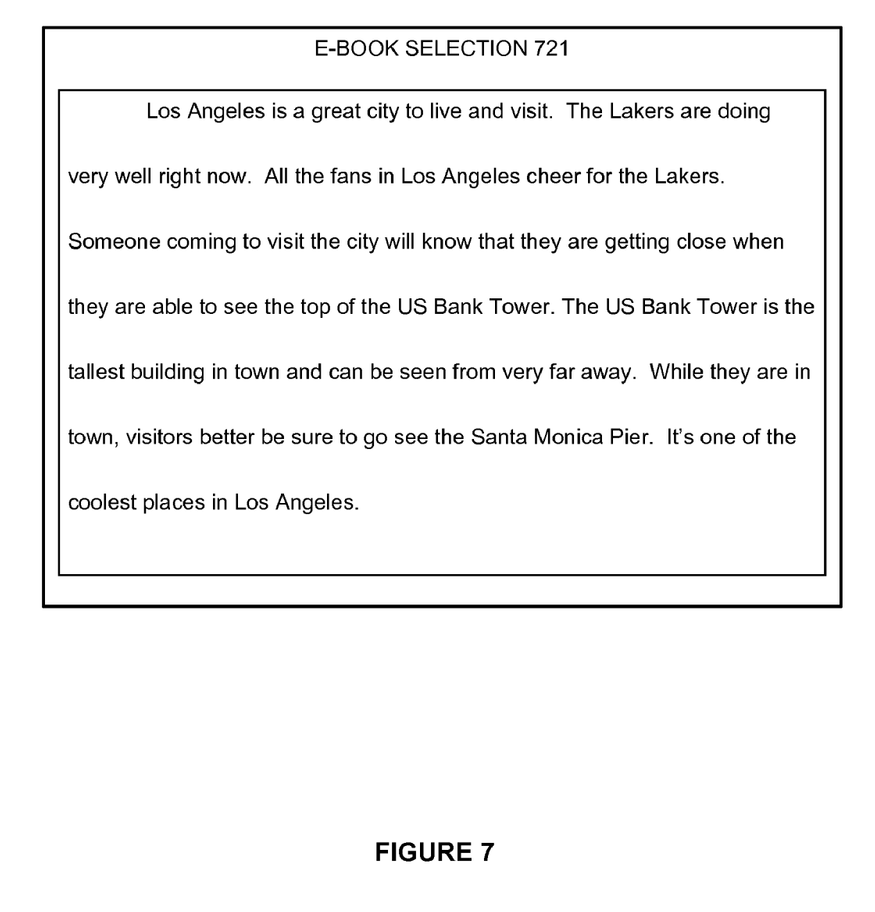
FIG. 7 illustrates a media selection with incorporated location specific content.

Mobile device 301 performs location specific content incorporation by placing "Los Angeles" in e-book selection 521 wherever [INSERT CITY] appears, "US Bank Tower" wherever [INSERT BUILDING] appears, "Santa Monica Pier" wherever [INSERT LANDMARK] appears, and "Lakers" wherever [SPORTS TEAM] appears. The resulting media may then be displayed on the display of mobile device 301. E-book selection 721 in FIG. 7 is an example of how e-book selection 521 may look after location specific content set 503 is incorporated.

The preceding example illustrates inserting text into e-book selection 521. However, if e-book selection 521 contained illustrations, pictures, or other type of graphic, then location specific content could also include those location specific elements for incorporation into e-book selection 521.

Figure 8:
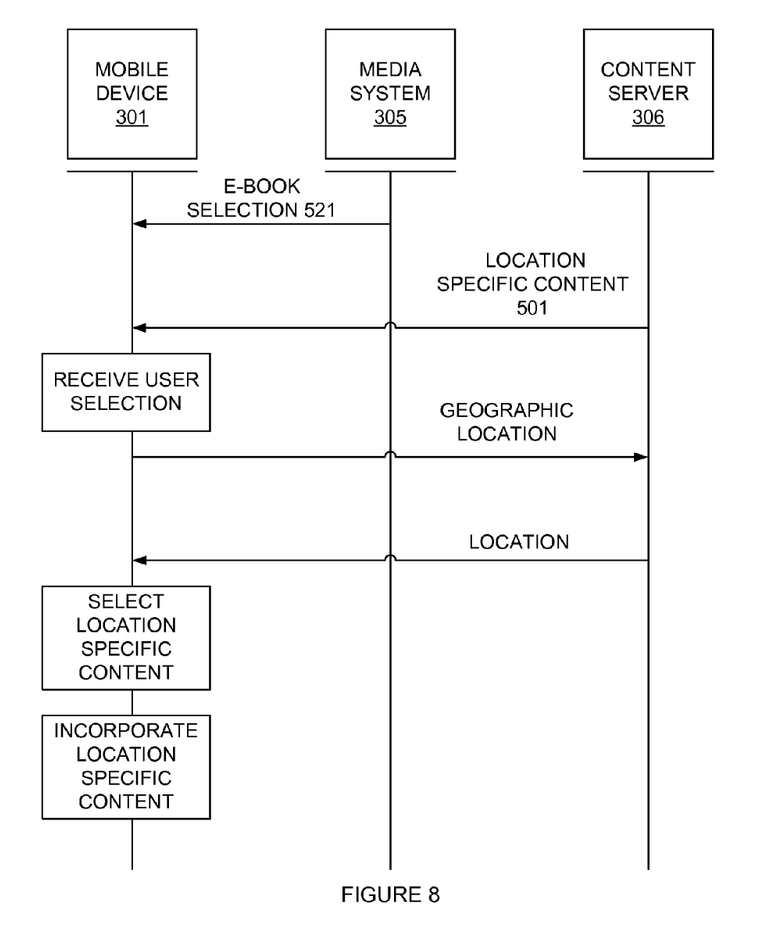
FIG. 8 is a sequence diagram that illustrates determining location specific content.

FIG. 8 is a sequence diagram that illustrates another example of determining location specific content. Mobile device 301 receives both e-book selection 521 from media system 305 and location specific content 501 from content server 306. Mobile device 301 receives a selection from a user indicating that mobile device 301 should display e-book selection 521. In this example, mobile device 301 may only know its geographic coordinates but does not know its location for the purposes of location specific content set selection. Thus, mobile device 301 transfers a message indicating its geographic location to content server 306. Mobile device 301 receives a message from content server 306 indicating the location of mobile device 301 for the purposes of location specific content selection from content server 306. The location indicates that mobile device 301 is located in the Los Angeles region. Therefore, mobile device 301 selects location specific content set 503. Mobile device 301 then incorporates location specific content set 503 into e-book selection 521.

Figure 9:
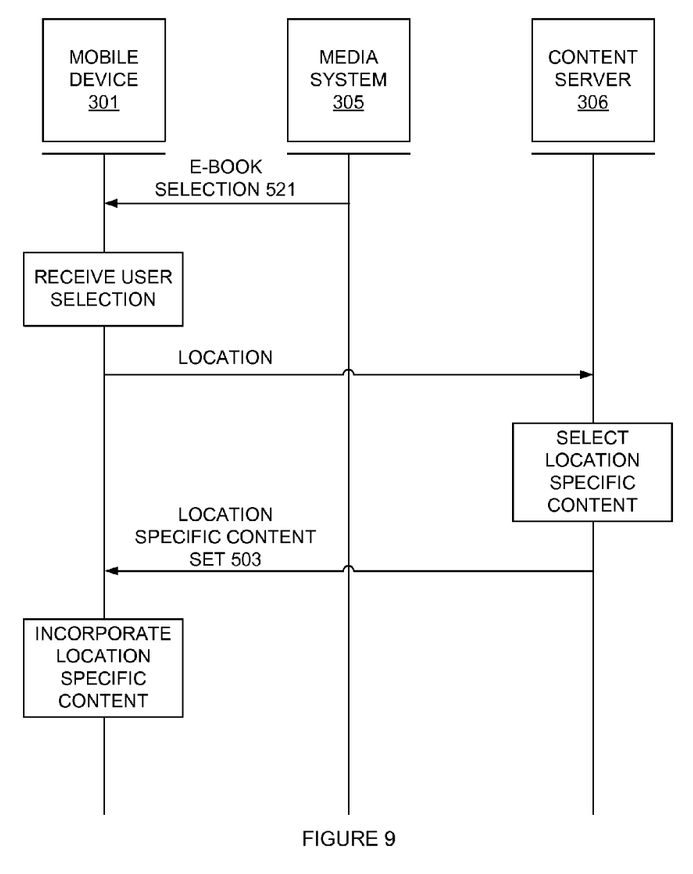
FIG. 9 is a sequence diagram that illustrates determining location specific content.

FIG. 9 is a sequence diagram that illustrates another example of determining location specific content. Mobile device 301 receives e-book selection 521 from media system 305. Mobile device 301 receives a selection from a user indicating that mobile device 301 should display e-book selection 521. Mobile device 301 transfers a message indicating its location to content server 306. In this example, content server 306 selects location specific content set 503 because Anaheim, Calif. is in a region surrounding Los Angeles. Content server 306 transfers location specific content set 503 to mobile device 301. Mobile device 301 then incorporates location specific content set 503 into e-book selection 521.

In each preceding example of determining location specific content, if location specific content corresponding to the location of mobile device 301 cannot be determined, then default content may be selected. The default content may be the location specific content corresponding to the content location that is closest to the location of mobile device 301 or the location specific content corresponding to the closest well known location to the location of mobile device 301. The default content may also be predetermined by the content creator.

If mobile device 301 were to move from one location to another, such as is shown by dotted arrow 340, then the location specific content may also change based on new location of mobile device 301. For example, location specific content could be tailored to a specific city. Therefore, mobile device 301 moving from base station 302 in one city to base station 303 located in another city would change the location specific content that is selected and inserted into the selected media. Likewise, if base station 302 and base station 303 are located in the same city, then moving from base station 302 to base station 303 does not change the location specific content determination. Alternatively, the location specific content inserted into the selected media may stay constant throughout the presentation of the selected media no matter where mobile device 101 moves in relation to its original determined location.

If mobile device 301 were instead communicating with base station 303 in location 331, which is located in Manhattan, then mobile device 301 selects and incorporates location specific content set 502 into e-book selection 521. Likewise, if base station 303 and mobile device 301 were located in Denver, then no set of location specific content sets 502-504 would correspond to the location. In that case, default location specific content is incorporated into e-book selection 521. The default location specific content could be any of location specific content sets 502-504 but may be another set defined by the content creator.

Figure 10:
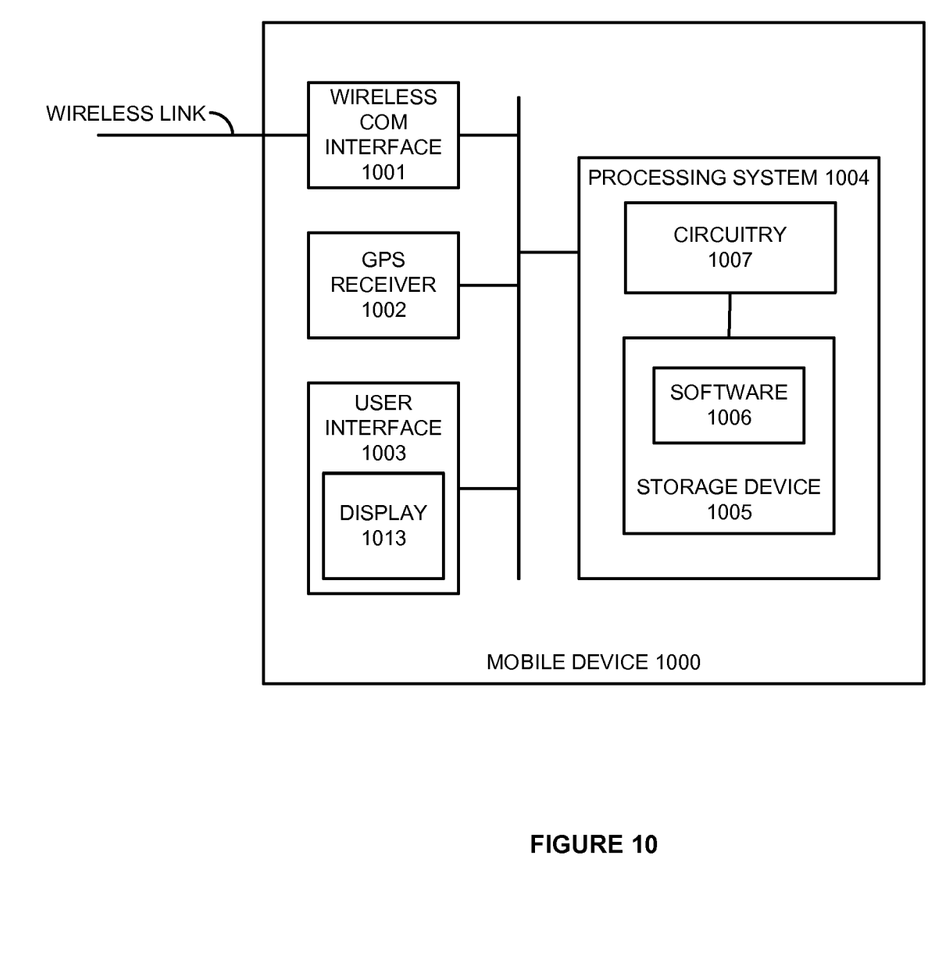
FIG. 10 illustrates a mobile device for presenting media with location specific content.

FIG. 10 illustrates wireless communication device 1000. Mobile device 1000 is an example of mobile devices 101 or 301, although devices 101 or 301 may use alternative configurations. Mobile device 1000 comprises wireless communication interface 1001, GPS receiver 1002, user interface 1003, and processing system 1004. User interface 1003 includes display 1013. Processing system 1004 comprises processing circuitry 1007 and storage device 1005 that stores operating software 1006. Processing system 1004 is linked to wireless communication interface 1001, GPS receiver 1002, and user interface 1003. Mobile device 1000 may include other well-known components that are not shown for clarity, such as a battery, camera, and enclosure.

Wireless communication interface 1001 comprises an antenna, RF transceiver, signal processing circuitry, software, and/or some other wireless communication components. Wireless communication interface 1001 may use various protocols, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format. Wireless communication interface 1001 exchanges text messages and IP messages to support location authorization and delivery as described herein.

User interface 1003 comprises components that interact with a user, such as buttons, lights, microphone, speaker, or some other user input/output apparatus—including combinations thereof. User interface 1003 may accept user input selecting media and present the selected media with location specific content to a user. User interface 1003 includes display 1013. Display 1013 is capable of presenting visual information, such as images, video, and text, to a user. Display 1013 may use electronic ink, liquid crystal display, organic light emitting diode, or some other way of presenting visual information. Display 1013 may include touch screen capabilities for accepting user input.

GPS receiver 1002 comprises an antenna, satellite receiver, signal processing circuitry, software, and/or some other satellite communication components. GPS receiver 1002 receives and processes GPS signals from GPS satellites to produce geographic coordinates that specify the current geographic location of mobile device 1000.

Processing circuitry 1004 comprises microprocessor and other circuitry that retrieves and executes operating software 1006 from storage device 1005. Storage device 1005 comprises a computer-readable storage medium, such as a disk drive, flash drive, data storage circuitry, or some other memory apparatus. Processing circuitry 1007 is typically mounted on a circuit board that may also hold storage device 1005 and portions of components 1001-1003.

Operating software 1006 comprises computer programs, firmware, or some other form of computer-readable processing instructions. Operating software 1006 may include an operating system, utilities, drivers, network interfaces, applications, or some other type of software. When executed by processing circuitry 1007, operating software 1006 directs processing system 1004 to operate mobile device 1000 to present media with location specific content as described herein for mobile devices 101 and 301.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobile communication device comprising:
   wirelessly receiving a plurality of media into the mobile communication device;
   storing the plurality of media in the mobile communication device;
   wirelessly receiving a plurality of location specific content into the mobile communication device;
   storing the plurality of location specific content in the mobile communication device;
   determining a location of the mobile communication device;
   receiving a user selection at the mobile communication device indicating a selection of the plurality of media for presentation;
   in response to the user selection, determining location specific content by transferring a message indicating the location of the mobile communication device to a content server and receiving a response message indicating location specific content of the plurality of location specific content that should be incorporated into the selected media;
   incorporating the location specific content into designated areas of the media selection for presentation to a user.

2. The method of claim 1 wherein determining the location of the mobile communication device comprises acquiring the global positioning system coordinates of the mobile communication device.

3. The method of claim 1 wherein determining the location of the mobile communication device comprises determining a location of a network access node that exchanges communications with the mobile communication device.

4. The method of claim 1 wherein the media comprises an e-book and the location specific content comprises location specific words for incorporation into the text of the e-book.

5. The method of claim 4 wherein the location specific content further comprises location specific graphics for incorporation into the body of the e-book.

6. The method of claim 1 wherein the media comprises audible content and the location specific content comprises location specific audio for incorporation into the audible content.

7. A mobile communication device comprising:
   an interface configured to wirelessly receive a plurality of media into the mobile communication device and wirelessly receive a plurality of location specific content into the mobile communication device;
   a processing system configured to store the plurality of media in a storage system, store the plurality of location specific content in the storage system, and determine a location of the mobile communication device;
   a user interface configured to receive a user selection at the mobile communication device indicating a selection of the plurality of media for presentation;
   in response to the user selection, the processing system further configured to determine location specific content by transferring a message indicating the location of the mobile communication device to a content server and receiving a response message indicating location specific content of the plurality of location specific content that should be incorporated into the selected media and incorporate the location specific content into designated areas of the media selection for presentation to a user.

8. The mobile communication device of claim 7 further comprising the processing system further configured to determine the location of the mobile communication device by acquiring the global positioning system coordinates of the mobile communication device.

9. The mobile communication device of claim 7 further comprising the processing system further configured to determine the location of the mobile communication device by determining a location of a network access node that exchanges communications with the mobile communication device.

10. The mobile communication device of claim 7 wherein the selected media comprises and e-book and the location specific content comprises location specific words for incorporation into the text of the e-book.

11. The mobile communication device of claim 10 wherein the location specific content further comprises location specific graphics for incorporation into the body of the e-book.

12. The mobile communication device of claim 7 wherein the media comprises audible content band the locations specific content comprises location specific audio for incorporation into the audible content.

13. A method of operating a communication network comprising:
   wirelessly transferring a plurality of media to a mobile communication device;
   storing the plurality of media in the mobile communication device;
   wirelessly transferring a plurality of location specific content to the mobile communication device;
   storing the plurality of location specific content in the mobile communication device;
   determining a location of the mobile communication device;
   receiving a user selection at the mobile communication device indicating a selection of the plurality of media for presentation;
   in response to the user selection, determining location specific content by transferring a message indicating the location of the mobile communication device to a content server and receiving a response message indicating location specific content of the plurality of location specific content that should be incorporated into the selected media;
   incorporating the location specific content into designated areas of the media selection for presentation to a user.

14. The method of claim 13 wherein determining the location of the mobile communication device comprises determining a location of a network access node that exchanges communications with the mobile communication device.

* * * * *